No. 677,213. Patented June 25, 1901.
G. HOEPNER.
AUTOMATIC WEIGHING MACHINE.
(Application filed May 15, 1899.)
(No Model.) 2 Sheets—Sheet 1.
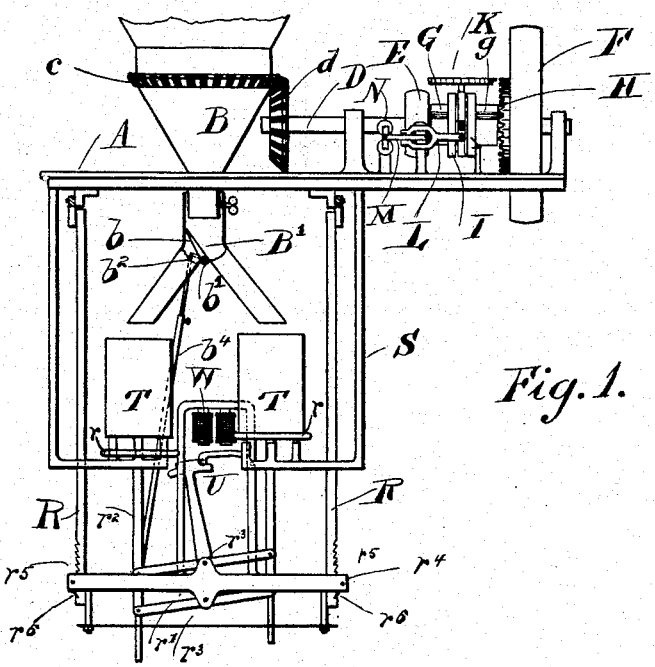
Fig. 1.
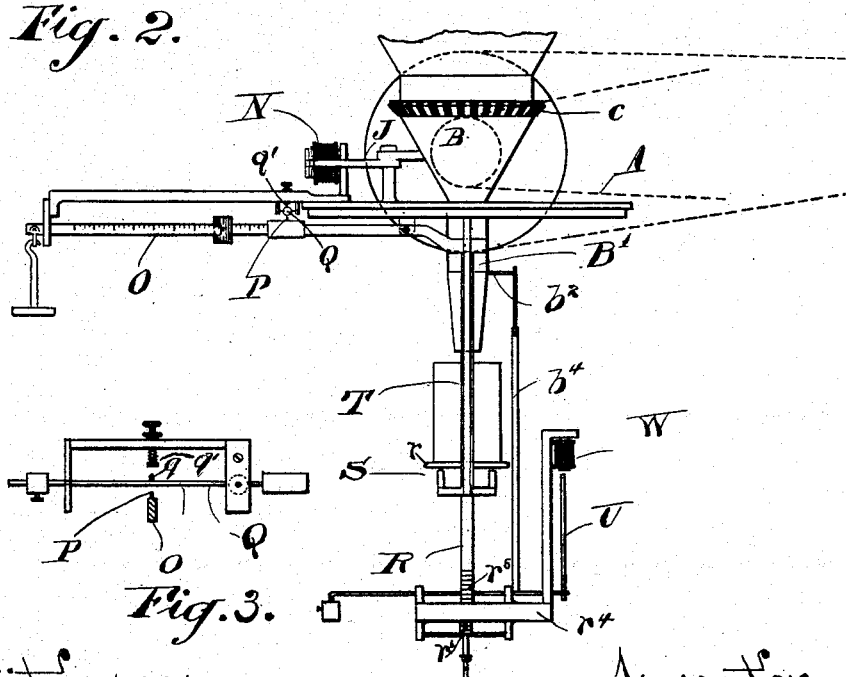
Fig. 2.
Fig. 3.
Witnesses:
Wm F. Wattson.
J. Johnson
Inventor:
George Hoepner
By W. H. Smyth
his atty No. 677,213. Patented June 25, 1901.
G. HOEPNER.
AUTOMATIC WEIGHING MACHINE.
(Application filed May 15, 1899.)
(No Model.) 2 Sheets—Sheet 2.
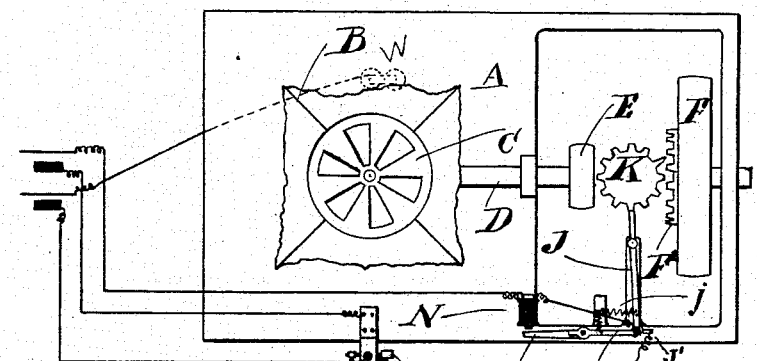
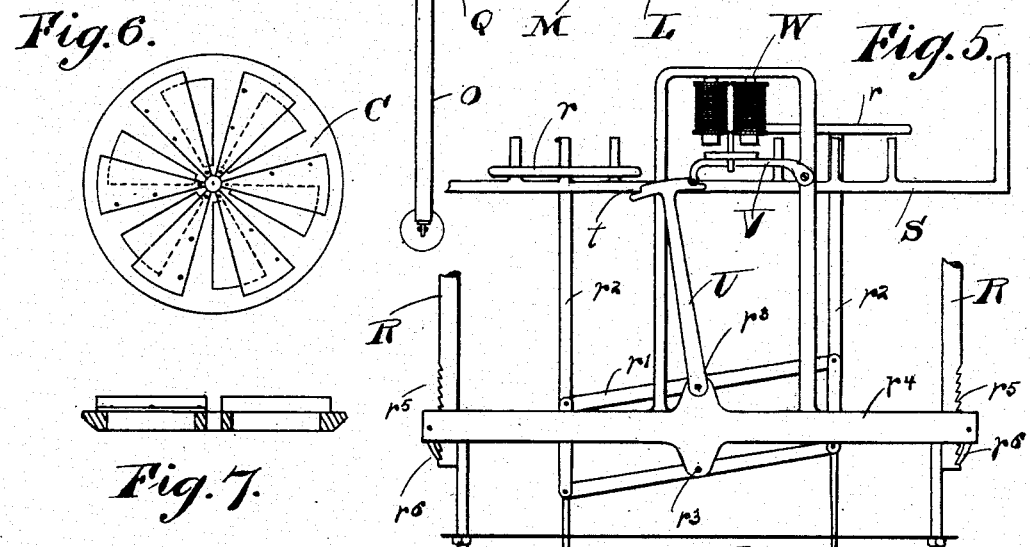
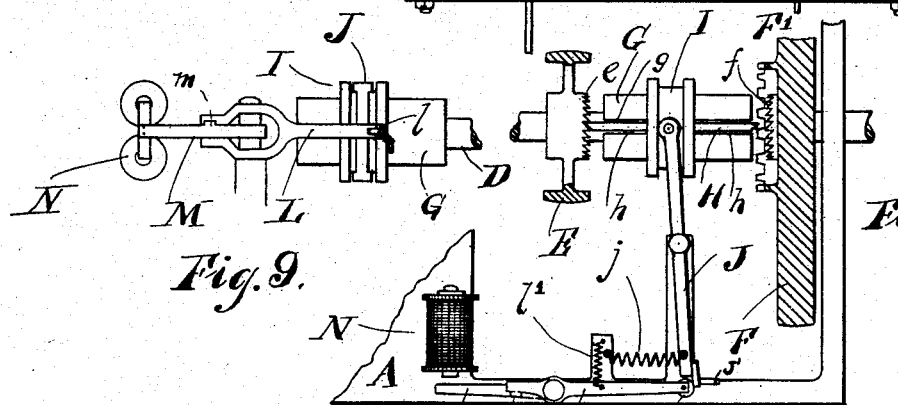
Witnesses:
Wm. F. Wattson.
J. Johnson.
Inventor:
George Hoepner
By W. H. Smyth
his atty

UNITED STATES PATENT OFFICE.

GEORGE HOEPNER, OF SANDWICH, ILLINOIS, ASSIGNOR TO THE UNION SCALE & MANUFACTURING COMPANY, OF SAN FRANCISCO, CALIFORNIA.

AUTOMATIC WEIGHING-MACHINE.

SPECIFICATION forming part of Letters Patent No. 677,213, dated June 25, 1901.

Application filed May 15, 1899. Serial No. 716,946. (No model.)

*To all whom it may concern:*

Be it known that I, GEORGE HOEPNER, a citizen of the United States, residing at Sandwich, in the county of Dekalb and State of Illinois, have invented certain new and useful Improvements in Automatic Weighing-Machines; and I do hereby declare the following to be a full, clear, and exact description of the same.

This invention relates to automatic weighing-machines, and in the form herein illustrated is more particularly applicable to weighing granular substances which have a tendency to clog or pack and are not of a free-flowing character.

It consists in the devices, instrumentalities and combinations of parts described in the specification and referred to in the claims.

The object of the present invention is to insure greater accuracy and speed in the operation of automatic weighing-machines, with great simplicity of combination.

One of the forms in which my invention may be incorporated is illustrated in the accompanying drawings, in which—

Figure 1 is a front elevation, portions being broken away to more clearly illustrate it. Fig. 2 is an end elevation. Fig. 3 is a detail, on enlarged scale, of the supplementary weighing-beam. Fig. 4 is a plan view of Fig. 1. Fig. 5 is an enlarged detail of the double weighing-receptacle with its tripping mechanism. Fig. 6 is a plan of the positive feed device on enlarged scale. Fig. 7 is a cross-section of Fig. 6. Fig. 8 is a plan view of the driving mechanism of the feed device on enlarged scale. Fig. 9 is a side elevation of a portion of Fig. 8 on enlarged scale.

Referring to the accompanying drawings, A is a frame or platform supporting a feed-hopper B and a rotary feeder C, which is shown in detail in Figs. 6 and 7. This feeder consists, preferably, of a series of cutting-blades attached to a rotating device, shown in the drawings as a bevel-gear $c$, suitably journaled in the material-receptacle above the hopper B in the path of the material to be weighed. Beneath the hopper B and preferably telescopically attached thereto is a bifurcated spout B'. At the point of bifurcation of the spout B' is a pivoted gate or other deflecting device $b$ for the material, attached to a rock-arm $b'$, provided with a crank-lever $b^2$. Loosely attached to this arm is a telescopic rod or other adjustable connection $b^4$, the other end of which is loosely attached to the rocking beam of the carton-weighing receptacle, which will be more fully described hereinafter. Upon the table A is also provided a shaft D, in suitable bearings, provided with a bevel-gear $d$, engaging with a bevel-gear $c$, secured to and concentric with the feeder C. (Shown in Fig. 1.) On the shaft D is a small pulley E and a large pulley F, each of which is supplied with ratchets, respectively $e$ and $f$. The pulley F is also supplied with a crown-gear F'. Secured upon the shaft D and intermediate of the pulleys E and F is a collar G, having a longitudinal groove $g$, in which is a sliding double-ended pawl H, provided with antifriction-bearings, (shown as rollers $h$ in Fig. 8,) adapted to engage by its end motion with the ratchets $e$ and $f$ alternately. Loosely fitted upon the collar G and in operative connection with the pawl H is a loose grooved collar I. Engaging with the groove of the collar I is a fork-lever J, pivotally attached to the frame A and provided with a spring $j$, one end of which is secured to the table, Fig. 8. Journaled on one arm of the fork is a gear K, of somewhat peculiar construction, suitably placed to mesh into and be driven by the gear F' when brought into proper relation therewith. The peculiarity of this gear consists in one of its teeth being much longer than the remainder, Fig. 4. A lever L is provided, pivoted to the table A and having preferably a friction-roller $l$ at one of its ends, adapted to engage with the end of lever J opposite to the fork. This lever L is provided with a light spring $l'$, one end of which is attached to the table.

An armature M is provided, one end of which is preferably pivoted on the pivot of the lever L, and a lug $m$ projects to engage with the lever L and move it in one direction by the motion of the armature. An electromagnet N is suitably placed to actuate the armature M when energized, Figs. 8 and 9.

Beneath the table and suspended therefrom is a graduated scale-beam O, provided with suitable stationary and adjustable weights for ordinary rough weighing. On this beam, suitably located, is a contact-point P in an electric circuit, suitably wired to a light contact device J', adapted to engage with the fork-arm J, preferably connected with, though insulated from, the table A.

Depending from the table is a secondary scale-beam Q, with adjusting-weights, freely pivoted and nearly balanced by a suitable counterweight. This beam is also provided with an electrical contact-point $q$. (Shown in Fig. 3.) Above contact-point $q$ is another contact-point $q'$, insulated from table A.

A weighing receptacle or platen of peculiar form is provided, suitably suspended from the weighing-beam by means of two depending rods R R. This preferably consists of two plates $r\ r$, supported upon and attached to a parallel-motion rocking beam $r'$ by means of uprights $r^2\ r^2$. This rocking beam is pivoted at $r^3$ to a cross-bar $r^4$, which is preferably connected adjustably to admit of vertical adjustment. For the sake of simplicity I have shown this adjustment as notches $r^5$ in the rods R R and spring pawls or latches $r^6$ to engage therewith.

Depending from the table A is a frame S, rigidly secured thereto, suitably arranged to pass beneath the weighing-plates $r\ r$. Projecting upward from the frame S through the plates $r\ r$ are stationary supports for the cartons or receptacles T T to receive the material to be weighed.

Attached to the side of the parallel-motion rocking beam $r'$ is an upwardly-projecting T-shaped latch-bar U, provided with notches $t\ t$, one at each end. (Shown clearly in Fig. 5.) A pawl or latch V is pivotally attached to an upward extension of the bar $r$, forming an armature adapted to engage with a suitably-placed electromagnet W, also attached to the same extension. One leg of the electromagnet W is connected to the battery, the other leg being connected to the framework of the machine.

In the operation of this device the material to be weighed rests in the hopper above the feeder C, which by its angular cutting-blades slices from the bottom of the material a continual supply, the amount of which is controlled and governed by the speed of rotation of the feeder C. This rotation is made variable in preferably two widely-differing speeds—a fast speed to produce a rapid-flowing filling-stream, whereby the carton or other receptacle is quickly supplied with nearly its full complement of material, and a very reduced speed, giving a small weighing-stream to complete the complement and weight desired. This change of speed is brought about by the devices connected with shaft D in the manner following.

The pulleys E and F are connected with a suitable source of power by means of belts. The source of motion in the belts may either be of uniform speed and the variation brought about by different sizes of the pulleys E and F or the motion of the belts themselves may receive different speeds. The lateral motion of the grooved collar I carries the double-ended pawl H into engagement in the first place with the fast-speed pulley, and consequently transmits a fast speed to the shaft D and feeder C. When the carton or other receptacle has received nearly its complement of material, the weighing-beam commences to rise, and thus brings the point P into electrical contact with the small secondary weighing-beam. This causes electrical connection with the armature M, which is thus drawn to its magnet N, releasing the fork-lever J. The fork by reason of its spring $j$ throws the pawl H into engagement with the ratchet on the slow-speed pulley F. This immediately reduces the speed of the shaft D and feeder C and breaks the circuit with the magnet N, thus releasing the armature M. This movement of the fork J carries also the gear K into engagement with the crown-gear F', which immediately begins to rotate. Before completing a rotation it brings, of course, the elongated tooth into engagement with the gear F', forming therewith a toggle. In passing the center position, it forces back again the fork-lever J to its original position. This movement of the pawl H locks the shaft again with the fast speed. During, however, the rotation of the gear K the weighing-beam has continued gradually to rise, owing to the comparatively slow increment of the weighing-stream, and the secondary beam makes electrical contact with contact-point $q'$ and completes the circuit by the current passing through the framework of the machine, which energizes the magnet W and draws the armature-pawl V out of engagement with the notch on the arm U, permitting the filled and weighed carton to drop onto the rigid supports of frame S and the parallel-motion rock-arm $r'$ to oscillate, and thus engage the notch on the other end of the T-head of lever U. Incidentally it raises the empty carton from the other stationary support, thus locking the rocking beam $r'$ at each operation. The movement of the parallel-motion rock-arm $r'$ also throws the stream-deflecting gate over through its connection $b''$, and thus the stream is deflected into the empty carton.

Owing to the duplex character of the device for the reception of the material to be weighed, a continuous flow of the material is not only permitted, but desirable, thus increasing the rapidity and efficiency of the machine, no time being lost between filling and weighing operations.

The stationary support for the cartons, besides the functions already described, performs the additional and desirable function of breaking the electric circuit immediately the weighing operation is completed by removing the weight entirely from the weighing-beam, thus permitting it to drop out of electric connection with the contact-points. The notched T-lever U forms alternately a lock for each member of the duplex weighing-platen.

In filling small or short cartons it may be desirable to reduce the length of the suspended stream or, in other words, reduce the distance between the end of the supply-spout and the carton or its support. This may be accomplished by either or both of the means shown in the drawings—that is to say, the telescopic spout may be moved down the desired amount or the weighing-platen, with its connections, may be raised on the rods R R. The ratchets $r^5 r^5$, with the spring-pawls $r^6 r^6$, secure the device at the desired elevation. The telescopic character of the connecting-rod $b''$ admits of ready adjustment to conform with the altered requirement.

It is evident that many changes may be made in the mechanical devices and arrangements and proportions of the parts to adapt this invention to the many forms of scales used in various branches of industry and many modifications will readily suggest themselves to mechanics skilled in the arts involved which may be advisable under various conditions without departing from the invention disclosed herein. I therefore do not desire to confine myself to the exact construction of the mechanism or the proportion of parts herein shown; but

What I claim as new, and desire to secure by Letters Patent, is—

1. A graduated scale-beam with a pea or other suitable counterpoise suitably connected to a device comprising a pivoted arm provided on each side of its pivot with a weighing-receptacle consisting of a horizontal platen adapted to support a carton in vertical position, said platens being suitably arranged to automatically engage cartons in weighing association alternately, and stationary parts adapted to disengage the cartons from such weighing association with the platens.

2. A graduated scale-beam with a pea or other suitable counterpoise suitably connected to a device comprising a pivoted arm provided on each side of its pivot with a weighing-receptacle consisting of a horizontal platen adapted to support a carton in vertical position, said platens being suitably arranged to automatically engage cartons in weighing association successively, and stationary parts adapted to disengage the cartons from weighing association, and electromagnetic connections controlling said successive engagements.

3. In an automatic weighing-machine, a graduated scale-beam with a pea or other suitable counterpoise, a device comprising a rock-arm $r'$ provided with a weighing-receptacle consisting of a horizontal platen adapted to support a carton in vertical position, suitably pivoted in a frame suspended from said beam, the locking-bar U and the latch-pawl V and connections controlling said pawl by movement of the weighing-beam.

4. In an automatic weighing-machine, a graduated scale-beam with a pea or other suitable counterpoise, a device comprising a rock-arm $r'$ provided with a weighing-receptacle consisting of a horizontal platen adapted to support a carton in vertical position, suitably pivoted in a frame suspended from said beam, the locking-bar U and the latch-pawl V and electromagnetic connections controlling said pawl by the movement of the weighing-beam.

5. In an automatic weighing-machine, a rotating cutter in the path of the material-supply and a driving mechanism therefor, comprising two driven pulleys upon a shaft, provided each with a ratchet on their adjacent faces, a pawl intermediate of said pulleys adapted to engage therewith and means controlled by a weight-moved member adapted to effect the alternate engagement of the pawl with the ratchets.

6. In an automatic weighing-machine, a moving feed device and driving connections comprising the shaft D with its pulleys E and F and their face-ratchets, the pawl H and collar I, the operating-fork J with its gear K substantially as described and suitable electromagnetic connections with the weighing-beam, to control the operation of said driving mechanism, substantially as herein set forth.

7. In an automatic weighing-machine, a graduated scale-beam having a pea or other suitable counterpoise and a pivoted duplex receiver for material to be weighed provided with a horizontal platen on each side of its pivot adapted to support a carton in vertical position suitably arranged to automatically engage in weighing association successively and a stationary part adapted to disengage the carton from weighing association, a continuous-feed device and means for deflecting the feed-stream and electrical connections between the beam and said feed device adapted to effect a variation in the size of the feed-stream.

8. In an electrically-controlled weighing-machine a graduated scale-beam having a pea or other suitable counterpoise and a device for the reception of a carton or material to be weighed and means independent of the receiving device interposed in the path of the carton-receptacle to receive the filled and weighed carton and means adapted to break the electric circuit.

9. In an automatic weighing-machine, a graduated scale-beam with a pea or other suitable counterpoise and a duplex receiver for material to be weighed and a bifurcated supply-spout provided with a deflecting-gate adapted to control the direction of the material, said spout telescopically adjustable with reference to the receiver.

10. In a weighing-machine a rocking lever having a non-discharging receiver of material to be weighed on each side of its pivot, a stationary device in the path of each receiver, above the lowermost position of such receiver, and adapted to support a carton in position prior to, and after being weighed.

GEORGE HOEPNER.

Witnesses:
WM. C. CLARK,
EDWARD HOMAK.